United States Patent [19]

Cawlfield

[11] Patent Number: 5,213,784
[45] Date of Patent: May 25, 1993

[54] PROCESS FOR THE PRODUCTION OF HIGH PURITY HYDROXYLAMMONIUM NITRATE

[75] Inventor: David W. Cawlfield, Cleveland, Tenn.

[73] Assignee: Olin Corporation, Cheshire, Conn.

[21] Appl. No.: 900,563

[22] Filed: Jun. 18, 1992

[51] Int. Cl.$^5$ ............................................. C01B 21/20
[52] U.S. Cl. ................................................... 423/387
[58] Field of Search ......................................... 423/387

[56] References Cited

U.S. PATENT DOCUMENTS

| | | | |
|---|---|---|---|
| 4,849,073 | 7/1989 | Dotson et al. | 204/101 |
| 4,889,704 | 12/1989 | Fuchs et al. | 423/387 |
| 4,956,168 | 9/1990 | Wagaman | 423/387 |

FOREIGN PATENT DOCUMENTS

3528760A1 2/1987 Fed. Rep. of Germany.
7009685 7/1970 Netherlands.

Primary Examiner—Wayne Langel
Attorney, Agent, or Firm—Ralph D'Alesandro; F. A. Iskander

[57] ABSTRACT

A process for the production of concentrated and highly purified hydroxylammonium nitrate is disclosed whereby diluted nitric acid is added to a solution containing excess aqueous hydroxylamine while the resultant mixture is cooled and agitated to obtain uniform mixing to avoid locally high concentrations of nitric acid. The mixed solution is maintained at a temperature of less than about 60° Centigrade.

5 Claims, No Drawings

PROCESS FOR THE PRODUCTION OF HIGH PURITY HYDROXYLAMMONIUM NITRATE

BACKGROUND OF THE INVENTION

This invention relates generally to the production of high purity hydroxylammonium nitrate and, more specifically, to a process for the production of concentrated hydroxylammonium nitrate from hydroxylamine and nitric acid.

Hydroxylamine nitrate has been produced by several processes utilizing hydroxylamine sulfate and converting it to the end product by processes such as electrodialysis or a cation-exchange process. Some processes produce aqueous hydroxylamine from hydroxylammonium sulfate. However, heretofore none have been found which produce the aqueous hydroxylamine salts by neutralization of the corresponding acid, without causing spontaneous decomposition upon addition of the concentrated acid. Conversely, addition of the hydroxylamine to nitric acid causes spontaneous decomposition of the product HAN, even when the nitric acid has been diluted to less than about 50% by weight.

Hydroxylamine nitrate has several commercial applications, such as in the purification of plutonium metal, as one component of a liquid propellant, and as a reducing agent in photographic applications. In some of these applications a highly purified form of the compound is required, especially when it is to be employed in propellant formulations where the hydroxylammonium nitrate (HAN) solution is stable in an aqueous solution, but must be completely free of transition metal elements, such as iron and copper.

Previous electrolytic processes have electrolyzed nitric acid solutions containing mineral acids such as sulfuric acid or hydrochloric acid to form hydroxylamine salts of these acids. The processes were carried out in an electrolytic cell having high hydrogen overvoltage cathodes, such as mercury or an alkali metal amalgam, with a diaphragm or membrane separating the cathode from the anode. However, sulfate and chloride impurities are also very undesirable for HAN used in propellants because these impurities can cause corrosion of the gun barrel and of components of the breech mechanism in weapons firing systems.

The hydroxylamine salt produced by the electrolytic processes of the prior art can be converted to hydroxylamine nitrate at low solution strength and in an impure state. One method is by electrodialysis as taught by Y. Chang and H. P. Gregor in Ind. Eng. Chem. Process Des. Dev. 20, 361-366 (1981). The double displacement reaction employed requires an electrochemical cell that has a plurality of compartments and requires both anion exchange and cation exchange membranes or bipolar membranes. This design entails significant capital costs and high energy costs.

U.S. Pat. No. 4,849,073 which issued Jul. 18, 1989 and is assigned to the assignee of the present invention, discloses a process and electrochemical cell to directly produce a concentrated hydroxylamine nitrate solution. A mercury cathode is used on top of a conductive plate that is also the top of the cooling compartment. This design entails the use of additional space for the separate cooling compartment and does not provide for high circulating catholyte flow rates or against the possible loss of the mercury cathode from the cell. The need to employ special precautions to prevent human exposure to mercury and the potential for contamination of the HAN with mercury are disadvantages of the electrochemical process. This process also requires more than two moles of high purity nitric acid for each mole of HAN produced, as well as a separate step to remove excess nitric acid before the HAN can be concentrated for use in propellants. Also, HAN Produced electrolytically is limited to about 3.5 molar concentration.

These and other problems are solved in the process of the present invention whereby a highly purified form of highly concentrated HAN can be Produced without excess nitric acid and with minimum HAN decomposition.

SUMMARY OF THE INVENTION

It is an object of the present invention to provide a process for the production of concentrated hydroxylammonium nitrate (HAN).

It is another object of the present invention to provide a process for the production of concentrated hydroxylammonium nitrate (HAN) which results in minimum HAN decomposition, but a maximum concentrated HAN product.

It is a feature of the present invention that concentrated nitric acid of less than about 70% by weight concentration, and more Preferably less than about 50% by weight concentration, is added to a solution containing excess hydroxylamine.

It is another feature of the present invention that the resultant solution of concentrated nitric acid and hydroxylamine is cooled to maintain the temperature at less than about 60° C., and more preferably less than about 40° C.

It is still another feature of the present invention that the addition of concentrated nitric acid to the excess hydroxylamine is accomplished by slow addition of the nitric acid and with continuous mixing.

It is yet another feature of the present invention that the process produces highly concentrated HAN without excess nitric acid, while using only about one mole of nitric acid per mole of HAN produced.

It is an advantage of the present invention that hydroxylammonium nitrate is produced by the instant invention from hydroxylamine and nitric acid with a minimal dilution of the nitric acid.

It is another advantage of the process of the present invention that hydroxylammonium nitrate is produced without the need for expensive equipment required in normal processes utilizing evaporation and vacuum steps.

It is still another advantage of the process of the present invention that the slow continuous mixing of the nitric acid and the solution containing the excess hydroxylamine avoids locally high concentrations of nitric acid.

These and other objects, features and advantages are obtained by the chemical process for the production of hydroxylammonium nitrate wherein nitric acid of less than about 70% by weight concentration is added to a solution containing excess hydroxylamine while the resultant solution is continuously cooled to maintain the temperature at less than about 60° Centigrade. The nitric acid addition is added slowly and with continuous mixing.

DETAILED DESCRIPTION OF THE PREFERRED EMBODIMENT

The process of the present invention for the production of concentrated hydroxylammonium nitrate consists of adding diluted nitric acid to a solution of aqueous hydroxylamine while cooling the resulting solution.

Since high purity hydroxylammonium nitrate (HAN) is stable in aqueous solution, it can be used in propellant formulations, but only when it is completely free of transition metal elements, especially iron and copper. To avoid the undesirable equipment corrosion problems caused by sulfate and chloride impurities, the present process for producing highly pure HAN, having substantially less than about 1 part per million (ppm) of transition metal elements and having less than about 1 ppm chloride and about 10 ppm of sulfate, has been formulated.

To avoid spontaneous decomposition while producing a HAN concentrated product, it is necessary to add nitric acid of less than about 70% concentration, preferably less than about 50% concentration, to a solution containing excess hydroxylamine while cooling the solution to maintain a temperature of less than about 60° C., and preferably less than about 40° C. This addition is carried out slowly with continuous mixing in order to avoid locally high concentrations of nitric acid.

Without being bound by theory, it is theorized that the decomposition problem is caused by the fact that nitric acid is an oxidizing acid, while hydroxylamine is a reducing base. The heat of neutralization accelerates the oxidation and reduction reactions that occur when a concentrated acid and base are mixed. It is hypothesized that the instant process avoids this reaction by diluting the nitric acid, which greatly reduces its reactivity as an oxidizer, and adding the nitric acid to the hydroxylamine, which further reduces the time during which the hydroxylammonium nitrate and strong nitric acid coexist.

The process of this invention is accomplished by:
1. Diluting the nitric acid to less than about 50% concentration by weight; and
2. Adding the nitric acid to the solution of hydroxylamine to obtain a solution of hydroxylammonium nitrate having a concentration of from about 3 to about 5 molar with a pH of from about 2.2 to about 1.76.

The hydroxylamine optionally can be diluted with water prior to the nitric acid addition step. This process can be made continuous by continuously adding both diluted nitric acid and hydroxylamine to a cooled, agitated vessel while continuously withdrawing the neutralized product. The agitation can be accomplished by any conventional means, such as, but not limited to, swirling or stirring.

In order to exemplify the results achieved by simultaneously cooling and stirring a solution formed by the addition of a concentrated solution of nitric acid to a solution containing excess hydroxylamine, the following examples are provided without any intent to limit the scope of the invention to the specific discussion thereon.

EXAMPLE 1

A sample of about 50% hydroxylamine was obtained from commercial sources. This sample was found to contain about 0.3 ppm iron and about 2 ppm sulfate. About 200 grams of deionized water were added to about 200 grams of electronic grade 70% by weight nitric acid to make approximately 35% by weight nitric acid solution.

About 272.7 grams of nitric acid solution was added to about 100 grams of the hydroxylamine solution to adjust the pH to about 2.2. The mixing was carried out in a 600 ml beaker, which was placed in an ice bath and had a magnetic stirrer that continuously mixed the solution during the addition. The addition rate was adjusted to maintain a temperature of less than about 30° C.

The resulting solution was analyzed by titration with a base and found to contain about 5.0 normal hydroxylammonium nitrate.

EXAMPLE A

A drop of about 70% by weight nitric acid was added to a well stirred solution of about 50% by weight hydroxylamine. At the point of addition, a popping-fizzing noise was observed and an aerosol was produced as the hydroxylammonium nitrate decomposed instantaneously.

EXAMPLE B

A drop of about 25% hydroxylamine was added to a well stirred beaker of about 35% nitric acid. About 5 seconds after the hydroxylamine was added, a vigorous effervescence of the solution was observed, indicating the decomposition of hydroxylammonium nitrate in the presence of excess nitric acid.

While the invention has been described above with references to specific embodiments thereof, it is apparent that many changes, modifications and variations in the materials, equipment and steps employed can be made without departing from the inventive concept disclosed herein.

For example, it is theorized that the pH of the solution containing the excess hydroxylamine could be less than about 2.2 when producing HAN product more concentrated than about 3 molar. At about 5 molar HAN, it is theorized that the pH would be about 1.76 at the point where there is no excess hydroxylamine as a result of the addition of the diluted nitric acid solution. This pH value is calculated from the following equation which was derived from experimental data for HAN concentrations ranging from about 1 to about 7 molar:

pH = 3.20 - 2.06 log[HAN molarity]. The experimental data was obtained by taking a sample of 13 molar HAN which was initially titrated to confirm there was no excess hydroxylamine or nitric acid in the solution. The HAN solution was then diluted over 10 discrete dilution steps while measuring the pH at each step until a concentration of about 1.8 molar was obtained. After fitting the PH versus concentration data by linear regression, the constants in the equation are as given above. Where the process is operated continuously, the pH, which is inversely related to the molarity, will vary from about 3.0 (corresponding to 1.0 molar) to about 1.4 (corresponding to 7 molar).

Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for the production of concentrated hydroxylammonium nitrate, comprising:

(a) diluting a nitric acid solution to less than 50% by weight concentration;

(b) adding the diluted nitric acid solution in an addition step to a solution containing excess hydroxylamine to form a product solution of hydroxylammonium nitrate; and (c) cooling the diluted nitric acid solution and the solution containing excess hydroxylamine during the addition step to less than about 60° C.

2. The process according to claim 1 further comprising continuously mixing the diluted nitric acid solution and solution containing excess hydroxylamine during the addition step.

3. The process according to claim 2 further comprising cooling the diluted nitric acid solution and the solution containing excess hydroxylamine during the addition step to less than about 40° C.

4. The process according to claim 1 further comprising diluting the solution containing excess hydroxylamine with water prior to the addition step of adding the diluted nitric acid solution.

5. The process according to claim 1 further comprising adjusting the pH of the solution containing the excess hydroxylamine to about 2.2 by the addition step.

* * * * *